Patented July 4, 1933

1,916,716

UNITED STATES PATENT OFFICE

LOUIS A. DAHL AND WILSON C. HANNA, OF COLTON, CALIFORNIA, ASSIGNORS TO CALIFORNIA PORTLAND CEMENT COMPANY, OF LOS ANGELES, CALIFORNIA, A CORPORATION OF CALIFORNIA

PROCESS FOR THE MANUFACTURE OF PORTLAND CEMENT

No Drawing. Application filed January 8, 1932. Serial No. 585,636.

This invention has reference to the manufacture of Portland cement, the principal object of the invention being to produce an improved Portland cement having the capacity to gain in strength more rapidly than ordinary Portland cement, without requiring time for setting in excess of that normally required by Portland cement. Briefly stated, our improved process attains this object by enabling Portland cement to be manufactured with higher content of combined lime than can be accomplished by the ordinary processes of making Portland cement. It is by virtue of the high lime content given the cement that the latter attains the desired property mentioned, that is the ability to gain higher early strength than ordinary Portland cement.

The invention will perhaps be best understood by prefacing the description of the process with a few remarks pertaining to the composition and constituents of normal Portland cement, and the effect had upon the finished product by complete lime-saturation of these constitutents or by at least saturation with lime to a higher degree than has heretofore been possible. And it may be of further benefit to define in advance certain expressions appearing throughout the description and in the appended claims.

The present state of knowledge concerning the chemical constitution of finished Portland cement, or Portland cement clinker, is such that all of the various compounds present therein cannot be definitely named. However, the principal components of Portland cement clinker are known and can be said to consist of lime (CaO), silica ($SiO_2$), alumina ($Al_2O_3$), and/or ferric oxide ($Fe_2O_3$). It is generally believed that the compounds in Portland cement formed from these components, comprise tricalcium silicate ($3CaO.SiO_2$), dicalcium silicate ($2CaO.SiO_2$), tricalcium aluminate ($3CaO.Al_2O_3$), and tetracalcium aluminoferrite ($4CaO.Al_2O_3.Fe_2O_3$). All of these compounds except dicalcium silicate are saturated with lime, that is, each is incapable of combining with additional lime with the exception of dicalcium silicate.

Hereinafter we shall refer to a chemical compound present in a product obtained by calcining materials, or mixtures of materials, in which the principal components are lime, silica, alumina, and/or ferric oxide, as being saturated with lime if that compound contains a greater proportion of lime than any other compound of the same components, capable of being formed by calcining such materials or mixture of materials. Thus dicalcium silicate ($2CaO.SiO_2$) is not saturated with lime because another compound, tricalcium silicate ($3CaO.SiO_2$) contains a greater proportion of lime and results from the calcination of certain of the materials mentioned above, or from the calcination of mixtures of such materials. A material or mixture of materials, will be regarded as saturated with lime if the percentage of lime present in the mixture is such as to make it theoretically possible to combine all of the lime with all of the remaining components capable of combining with lime, to form only lime-saturated components and with no free lime remaining. And a material, or mixture of materials, will be regarded as being over-saturated with lime if the percentage is greater than that required for saturation.

As is commonly known, complete combination of the lime may not always occur in the manufacture of Portland cement, particularly with the result that some free lime may be present in the product. This may result from the temperature or time, or both temperature and time, of calcination being such as to prevent complete combination of the lime even though the percentage of lime does not exceed the limit theoretically required for complete combination of lime or lime-saturation. Of course where the amount of lime in a mixture is greater than that theoretically required for saturation, more lime is present that can possibly combine with the other components, and as a result free lime will be present in the calcined product however thoroughly the mixture may be calcined.

On the theoretical assumption that the principal compounds present in Portland cement clinker combine to form the compounds above named, and that no other components are present that can combine with any or all of the principal components named, the percentage of lime required for lime saturation may be determined by adding the following values; 2.80 times the percentage of silica, 1.65 times the percentage of alumina, and 0.35 times the percentage of ferric oxide. In commercial Portland cement, other components such as magnesium, soda, potash and titanium are present, since these occur naturally in the raw materials from which the principal components of Portland cement clinker are derived. Since such components as magnesia do not appear to combine to any appreciable extent with any of the other components, the magnesia content of the clinker may be disregarded in compounding the percentage of lime required for lime-saturation. The content of certain other components, such as soda, potash and titanium, are not taken into consideration in computing the percentage of lime required for saturation, since present day knowledge of the chemical constituents of Portland cement clinker does not afford information necessary for including the percentages of these components in the computation.

It is found in practice that mixtures of Portland cement raw materials which are saturated with lime, in accordance with the foregoing method of computation, are very difficult to calcine to such a degree that no free lime is present. This indicates that the method of computation is at least approximately correct. It should be understood that the above theoretical considerations are based upon present day knowledge of the constitution of Portland cement clinker. It may be that discoveries may be made in the future relating to the chemical constitution of Portland cement clinker which will modify the factors used in computing the percent of lime required for complete saturation, or may supply information by means of which it will be possible to compute the influence of soda, potash, titania and other minor components of Portland cement clinker upon the percentage of lime required for saturation with lime. It will therefore be understood that the invention is not limited to the present day conception of the constitution of Portland cement clinker.

As previously stated, Portland cement clinker produced in the usual processes of manufacturing Portland cement, contains a smaller percentage of lime than the amount required for saturation with lime. The difference between the percentage of lime actually present and the percentage of lime required for saturation with lime will hereinafter be referred to as lime deficiency. On the other hand clinkers may be made which are over-saturated with lime. The value obtained when the percentage of lime required for saturation with lime is subtracted from the percentage of lime actually present will hereinafter be referred to as lime excess. And these terms "lime-deficiency" and "lime-excess" will be applied not only to clinker compositions, but also to the composition of raw materials or mixtures of raw materials which have been previously converted by computation to a clinker, or non-volatile, basis.

Mixtures of Portland cement raw materials in which the lime deficiency is low, say less than 5%, are difficult to calcine. That is to say, if it be attempted to obtain a clinker saturated with lime, or substantially so, by adding to the raw materials the theoretical percentage of lime required for complete saturation, and thereafter subjecting the materials to calcination according to the usual processes for calcining materials to Portland cement clinker, it is found that the combination of lime with the other components of the clinker produced from the mixture of raw materials, is incomplete. The free lime which results from incomplete combination causes the cement made from such clinker to be unsound, and for that reason such mixtures are avoided in Portland cement making processes.

In accordance with the present processes, we are able to produce a Portland cement that is substantially lime-saturated, or at least a Portland cement in which the percent of combined lime is considerably greater than the percentage of combined lime in ordinary Portland cement. Generally speaking, the process comprises first the calcination to incipient fusion of a mixture of materials containing all, or at least some of the principal components of Portland cement, with an excess of lime over and above that required for saturation, to produce an over-saturated clinker in which free lime is present; and second, the calcination to incipient fusion of the over lime-saturated clinker so produced with lime-deficient or ordinary Portland cement clinker.

The percentage of lime in the lime-deficient clinker mixed with the over-limed clinker is sufficiently low that the percentage of lime in the clinker mixture subjected to the second calcining operation will not exceed that required for complete saturation of the Portland cement clinker to be formed. The amount of lime in the second calcined mixture however will be so regulated as to approach the amount required for complete saturation as to lime, and preferably will be maintained within such limits that the lime deficiency will not substantially exceed around 8%. It may be stated that generally we prefer to control the lime content of the second calcined mixture so that the lime deficiency will not exceed 5%.

In carrying out the process, we first form an original mixture of materials in which, preferably, lime, silica, alumina and iron oxide are the essential components, the lime being present in amount greater than that required for saturation. The materials to be used in this first mixture may consist of natural raw materials, such as cement rock, lime stone, clay, shale, marl, or other substances containing part or all of the components of Portland cement, or the materials to be put into the mixture may consist of waste products containing the components desired.

As another source of Portland cement components that may be used in this first mixture, we may prefer to use cement stack dust. The relative proportions of the principal Portland cement components in cement stack dust is approximately the same as the proportions of such components in the mixture of materials burned in the kiln. The relative proportion of lime, however, is often somewhat greater, owing to the fact that in many cases the particles of lime are more readily blown out of the kiln into the stack. The stack dust in that case consequently contains a higher percentage of lime than is required for saturation. The cement stack dust may be used exclusively, or mixed in any desired proportions with natural raw materials or waste products, of the character mentioned above. Cement stack dust, if used, may be collected in a dry condition and without removal of undesirable substances such as soda, potash and sulphur, which ordinarily occur in such proportions as to render cement stack dust, if used in large quantities, unsatisfactory as a source of Portland cement components in the ordinary processes of manufacturing Portland cement. As an alternative procedure in using cement stack dust, we may collect the latter by a wet process in which such soluble objectionable substances as potash and soda are leached out and removed from the collected stack dust.

It will be understood that the essential requirement of the materials to be put into the described over limed original mixture, is that the mixture shall contain all or at least a greater portion of the Portland cement components. The invention broadly contemplates the use of any material or mixture of materials answering to this requirement. As we have indicated, raw materials of the character above named may be used, as may stack dust, either alone or mixed with other materials.

The lime content of the materials to be calcined is so adjusted that the percentage of lime preferably will not greatly exceed 5% of the amount required for saturation, although it is to be understood that the invention is not to be regarded as limited in this respect, since if desired, the excess of lime may exceed 5% of that required for saturation. In adjusting the composition of the mixture with respect to lime, it may be found necessary to add a certain proportion of lime, or the required amount of lime may be present in the materials, thereby necessitating no further addition of lime. In case the materials contain such objectionable impurities as soda and potash, as in the case of stack dust from which these impurities have not been removed, calcining the materials in the presence of an excess amount of lime is beneficial in that the presence of excess lime serves to effectively remove the greater proportion of these impurities by volatilization during the calcining operation.

Thus while ordinarily materials containing such impurities would be objectionable, when used in large quantities in the making of Portland cement, the fact that according to the present process these impurities are effectively removed by virtue of the excess lime, widens the range of raw or starting materials capable of use. Another possible advantage had by adjusting the composition of the mixture with respect to lime, as described, is in securing thorough decomposition of the silica, alumina and iron compounds in the original materials so that although the silica, alumina and iron may not be entirely in the form of such silicates, aluminates and ferrites of lime as may be desired in the final product, they will have become converted more nearly to that form than would be the case if an excess of lime were not present.

As will be recalled, the percentage of lime required for saturation is determined by calculations based upon the chemical constitution of Portland cement to the best of present day knowledge, the values added to arrive at the total amount of lime required being as follows: 2.80 times the percentage of silica, 1.65 times the percentage of alumina, and 0.35 times the percentage of ferric oxide. The excess lime added will, as stated, preferably not greatly exceed 5% of the lime required for saturation as calculated according to the above values. It may be stated at this point that the excess lime is limited for the reason that we find that more thorough blending of the clinker resulting from calcination of the mixture, with other materials with which the clinker is mixed to obtain the final product, is had where the excess lime is held substantially within the limit stated.

The mixture of materials in the presence of the excess lime, is burned, preferably in a rotary kiln, to a temperature of incipient fusion, forming a clinker in which an excess of lime is present, that is in which there is free lime. It is to be noted that the clinker so formed is not a Portland cement clinker, since the latter will always contain an amount of lime not exceeding the amount required for saturation. The over-limed clinker is next combined with lime-deficient clinker, for example an ordinary Portland cement clinker made according to the usual processes. The proportion of lime-deficient Portland cement clinker added to the over-limed clinker obtained from the first burning will be so regulated that the lime-deficiency of the mixture will not substantially exceed 5%. After adjusting the composition of the mixture, the materials, ground and intimately mixed, are calcinated at a temperature of incipient fusion, producing a clinker which when ground with about 3% of gypsum makes a Portland cement possessing the property of obtaining exceptional early strength. Ordinarily the temperature of the calcining operation will be in the neighborhood of from 2450° F. to 2700° F.

In the production of Portland cement clinker of superior quality one of the most important requirements is that the materials which are calcined should be intimately mixed. The ideal condition is one in which any portion of a mixture, however small, is of the same composition as the mixture as a whole. In our process this ideal condition is more nearly obtained than in the ordinary process in which the mixture to be calcined consists entirely of natural raw materials, or in other processes in which the mixture consists of clinker and natural raw materials.

Ordinarily in making Portland cement, the raw materials generally used are widely different in composition, and differ in density. The draft in the kiln tends to carry some of the raw material out of the kiln. Some of the raw materials are carried out more readily than others, so that a change in composition is thereby effected. In our process the various clinkers fed into the kiln in place of the usual raw materials are more nearly identical in density, so that one clinker is not carried out by the draft with appreciably greater ease than another. Furthermore, the differences in composition between the clinkers is comparatively small, so that any differences which may exist in the degree to which they are carried out by the draft have only a negligible effect upon the compostion of the mixture. Control of composition of the product can consequently be secured to a greater degree than can be secured in the ordinary process of Portland cement manufacture, or in processes in which the mixture to be calcined consists of raw materials and clinker.

It is generally understood that Portland cement clinker produced at a temperature just sufficient to secure complete combination of lime with the other components of the clinker is superior in quality to clinker of the same composition produced at a higher temperature. For instance, if complete combination of lime with the other components of clinker can be obtained by calcining at a temperature of 2500° F. a clinker of the same composition, calcined at 2700° F. for a time sufficient to obtain complete combination of lime with the other components of the clinder, will be of inferior quality. In our process the mixture which is calcined to make a Portland cement clinker is composed entirely of materials which have been previously calcined, and in which the combination of lime with the other components has been almost completely accomplished. The mixture may therefore be calcined at comparatively low temperatures, producing a clinker of superior quality.

As a result of the described process, we are able to give to the finished Portland cement a higher degree of lime-saturation than is possible according to commonly used processes wherein the cement forming raw materials are compounded and subjected to only a single burning. In such processes if it be attempted to obtain a finished product which is saturated or substantially saturated with respect to lime by calcining a mixture of raw materials of such composition as to render the final product lime-saturated to a high degree comparable to that here attained, it is found to be impossible to produce a finished product in which no free lime is present, or in which the percentage of free lime is negligible. In the present process, these objections are overcome by virtue of the fact that the material calcined to produce the clinker which is ground with gypsum to form the final product consists entirely of previously calcined clinkers in which a large part of the chemical changes desired in the final product have been effected.

We claim:—

1. The process of making Portland cement that includes, first calcining to incipient fusion material containing stack dust and over-saturated with lime, to produce a clinker that is over-saturated with lime, and then mixing the clinker with lime-deficient Portland cement clinker and calcining the mixture to produce a final Portland cement clinker, the composition of said mixture being such that the lime deficiency in said final Portland cement clinker does not substantially exceed 5%.

2. The process of making Portland cement that includes, first calcining to incipient fusion material containing stack dust and over-saturated with respect to lime, and thereby producing an over-limed clinker, and then mixing the clinker with lime-deficient clinker and calcining the mixture to incipient fusion to produce a Portland cement clinker containing no appreciable lime in excess of that required for saturation with lime.

3. The process of making Portland cement that includes, first producing a clinker containing Portland cement components and over-saturated with respect to lime, and then mixing the clinker with lime deficient clinker and calcining the mixture to incipient fusion to produce a Portland cement clinker, the composition of said mixture being such that said Portland cement clinker is substantially saturated with lime but contains no appreciable lime in excess of the amount required for saturation.

4. The process of making Portland cement that includes, first producing a clinker containing Portland cement components and over-saturated with respect to lime, and then mixing the clinker with lime-deficient Portland cement clinker and calcining the mixture to produce a Portland cement clinker, the composition of said mixture being such that the lime deficiency in the last mentioned Portland cement clinker does not substantially exceed 5%.

5. The process of making Portland cement that includes, first producing a clinker containing Portland cement components and over-saturated with respect to lime, and then mixing the clinker with lime-deficient clinker and calcining the mixture to produce a Portland cement clinker, the composition of said mixture being such that the lime deficiency in the last mentioned Portland cement clinker does not substantially exceed 5%.

In witness that we claim the foregoing we have hereunto subscribed our names this 14 day of December 1931.

LOUIS A. DAHL.
WILSON C. HANNA.